United States Patent
Säwe et al.

(10) Patent No.: US 9,410,027 B2
(45) Date of Patent: Aug. 9, 2016

(54) VULCANIZATION-ACCELERATING MIXTURE

(75) Inventors: Martin Säwe, Birkenau (DE); Dietmar Hoff, Altrip (DE); Willi Grieshaber, Viernheim (DE); Harald Kleinknecht, Alzey (DE)

(73) Assignee: Rhein Chemie Rheinau GmbH, Mannheim (DE)

( * ) Notice: Subject to any disclaimer, the term of this patent is extended or adjusted under 35 U.S.C. 154(b) by 397 days.

(21) Appl. No.: 12/847,019

(22) Filed: Jul. 30, 2010

(65) Prior Publication Data

US 2011/0092358 A1    Apr. 21, 2011

(30) Foreign Application Priority Data

Aug. 7, 2009  (EP) ..................................... 09167499

(51) Int. Cl.
*B01J 31/06* (2006.01)
*B01J 31/18* (2006.01)
*B01J 31/22* (2006.01)
*C08K 5/00* (2006.01)

(52) U.S. Cl.
CPC ................... *C08K 5/0025* (2013.01)

(58) Field of Classification Search
CPC ............................ C08K 5/0025; C08L 21/00
USPC ......................................... 502/155, 159, 167
See application file for complete search history.

(56) References Cited

U.S. PATENT DOCUMENTS

| | | | | |
|---|---|---|---|---|
| 2,829,132 | A * | 4/1958 | Tawney et al. | 525/332.5 |
| 3,287,440 | A * | 11/1966 | Giller | 525/139 |
| 3,985,832 | A | 10/1976 | Newman | |
| 4,022,848 | A | 5/1977 | Lukich | |
| 4,683,270 | A | 7/1987 | Hollaway, Jr. | |
| 5,624,988 | A | 4/1997 | Bauer et al. | |
| 5,889,119 | A * | 3/1999 | Coran et al. | 525/232 |
| 7,521,501 | B2 * | 4/2009 | James et al. | 524/502 |
| 2007/0123619 | A1 * | 5/2007 | Kulbaba et al. | 524/236 |
| 2008/0128658 | A1 * | 6/2008 | Jungermann et al. | 252/478 |
| 2008/0194746 | A1 * | 8/2008 | Jiang et al. | 524/261 |
| 2010/0022699 | A1 * | 1/2010 | Blanchard et al. | 524/514 |

FOREIGN PATENT DOCUMENTS

DE   2210129   9/1972
RU   2065459 C1   8/1996

OTHER PUBLICATIONS

European Search Report from co-pending Application EP09167499 dated Jan. 11, 2010, 4 pages.
Eholzer, U.; Kempermann, T; "Ein never Polychloroprenbeschleuniger als Ersatzpunkt fur Ethylenthioharnstoff" Kautschuk Gummi Kunststoff, Bd. 33, Nr. 9, 1980, Seiten 696-699. XP1536711.
Warrach, W.; Tsou, Don; "A Curative for Chlorobutyl Rubber 3-Methyl-Thiazolidine-Thione-2"; Elastomerics, Bd. 116, Nr. 11, 1984, Seiten 26-29. XP009127721.

(Continued)

*Primary Examiner* — Jun Li

(57) ABSTRACT

The present invention relates to a mixture which can be used as vulcanization accelerator, to a process for producing the mixture and to use of the mixture, to vulcanizates which comprise the said mixtures or which comprise corresponding individual constituents of the mixture, and also to vulcanizates which are produced with use of the said mixture.

10 Claims, 1 Drawing Sheet

(56) References Cited

OTHER PUBLICATIONS

Saewe, M. et al; "Cure Systems for High Performance Rubber Applications"; RubberChem 2006, International Conference, 5th, Munich, Germany; Dec. 5-6, 2006, pp. 1-14.

Christov D.; Bonchev, T.S.; "Untersuchung der Beschleunigung der Harz-Vulkanisation von Butylkautschuk mit Hilfe des Mossbauer-Effektes"; Kautschuk Gummi Kunststoffe, Bd. 29, No. 11, 1976; Seiten 673-675.

* cited by examiner

VULCANIZATION-ACCELERATING MIXTURE

The present invention relates to a mixture which can be used as vulcanization accelerator, to a process for producing the mixture and to use of the mixture, to vulcanizates which comprise the said mixtures or which comprise corresponding individual constituents of the mixture, and also to vulcanizates which are produced with use of the said mixture.

Vulcanization is a chemical/industrial process which makes rubber durable, by using time, heat and pressure. In an example of this process, a rubber mixture composed of crude rubber, sulphur or sulphur-donor substances, such as tetrabenzylthiuram disulphide, catalysts (to increase reaction rate) and fillers is mixed and heated. During this process, the long-chain rubber molecules are crosslinked via sulphur bridges. The rubber or rubber mixture thus loses its plastic properties, and the vulcanization process converts the material from the plastic state to an elastic state.

When rubber is vulcanized by sulphur, materials known as vulcanization accelerators are added to accelerate the process, these generally being organic substances. Examples of these are xanthogenates, dithiocarbamates, mercaptobenzothiazoles and other compounds, such as thiozoles, guanidines, thiourea derivatives or amine derivatives.

Other frequently used vulcanization accelerators are tetramethylthiuram disulphide and ethylenethiourea. There is currently critical discussion of the role of ethylenethiourea as vulcanization accelerator. By way of example, there is a threshold value of 0.05 ppm for ethylenethiourea, based on its toxicity and suspected carcinogenicity (BGBl Rückstands-Höchstmengenverordnung [German Federal Legal Gazette, Regulation relating to maximum residual quantities] of 13 Jan. 2003). Ethylenethiourea also exhibits reproductive toxicity.

The implication of this, in particular in the light of the requirements of the EU REACH Regulation (Registration, Evaluation, Authorization and Restriction of Chemicals), is that this chemical will be subject to full registration in the near future. An authorization process for ethylenethiourea is also highly probable under REACH. This generates large additional costs, while the outcome of the authorization procedure is currently uncertain. There is therefore a need to replace this vulcanization accelerator with alternative accelerator systems.

However, at the same time, a technical advantage of accelerator systems comprising ethylenethiourea and a thiuram disulphide derivative, such as tetramethylthiuram disulphide (TMTD) for vulcanizing chlorobutadiene rubber (CR) is that, as vulcanization proceeds, they provide a pronounced viscosity minimum, followed by a steep viscosity rise due to onset of crosslinking. This viscosity minimum at the start of onset of vulcanization is a decisive factor for good processability of the vulcanization mixture, for example in an extruder or on roll mills, and also in the subsequent steps of processing, such as injection moulding. The pronounced subsequent viscosity rise that occurs when these systems are used moreover indicates rapid crosslinking of the systems, and this in turn is important for short cycle times in mass production.

The toxicity of ethylenethiourea therefore makes it desirable to replace this compound by alternative systems in vulcanization-accelerator systems. Accordingly, these new vulcanization chemicals should likewise give a pronounced viscosity minimum at the start of the vulcanization process and a pronounced viscosity rise during the course of the vulcanization process.

It is therefore an object of the present invention to provide a mixture free from ethylenethiourea. Ethylenethiourea should be replaced here by compounds which have less toxic effect, but at the same time the processing conditions for the vulcanization process should remain constant or indeed even be improved.

According to the invention, an accelerator system is now proposed for achieving the said object, and encompasses
(1) as a first constituent, 3-methylthiazolidine-2-thione,
(2) a second constituent, selected from the group consisting of a thiuram disulphide derivative, a thiuram polysulphide derivative and/or mercaptobenzothiazole disulphide, and
(3) as third constituent, at least one Lewis acid, preferably polymer-bound.

According to the invention, it has been found that this mixture, as vulcanization accelerator, gives vulcanization behaviour similar to the good behaviour obtained with systems using ethylenethiourea, while the individual constituents used in the mixture according to the invention are toxicologically preferable.

The present invention therefore provides a mixture encompassing (1) 3-methylthiazolidine-2-thione, (2) thiuram disulphide derivative or thiuram polysulphide derivative and/or mercaptobenzothiazole disulphide and (3) at least one Lewis acid.

The mixture according to the invention is added to the vulcanization elastomers prior to the vulcanization process.

For the purposes of the present invention, the expression thiuram polysulphide derivative preferably means compounds of the following formula (I)

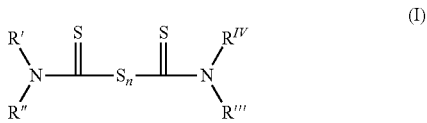

where $R^I$, $R^{II}$, $R^{III}$ or $R^{IV}$, respectively identical or different, is an arylic, aliphatic or cyclic alkyl group having up to 8 carbon atoms and n=from 2 to 6. For n=2, this formula represents the thiuram disulphide derivatives where $R^I$, $R^{II}$, $R^{III}$ or $R^{IV}$ is as defined above.

Mention may particularly be made of the following compounds, which are used with preference.

Tetramethylthiuram disulphide (TMTD), dipentamethylenethiuram disulphide (DPTD), bis(pentamethylene)thiuram tetrasulphide (DPTT), tetraethylthiuram disulphide (TETD), bis(dibutylthiocarbamyl) disulphide (TBTD), N,N,N',N'-tetraisobutylthiuram disulphide (TiBTD), tetrabenzylthiuram disulphide (TBzTD) and dimethyldiphenylthiuram disulphide (MPTD). In the case of tetrabenzylthiuram disulphide, unlike other thiuram disulphide derivatives, no carcinogenic nitrosamines of any kind can be produced during the vulcanization process, and particular preference is therefore given to this substance. This is confirmed by TRGS [Technical Rules for Hazardous Substances] 552 relating to N-nitrosamines.

The Lewis acid (3) to be used for the purposes of the present invention can be any desired Lewis acid which accelerates the vulcanization of appropriate elastomers. In particular, the Lewis acid to be used according to the invention has been selected from the group consisting of stannous chloride, stannous chloride dihydrate, tin dioctanoate, tin oxalate, dibutyltin carboxylate, monobutyltin tris(2-ethylhexanoate), dibutyltin diisooctanoate, dibutyltin diacetate, dibutyltin oxide, aluminium(III) chloride, titanium tetrachloride, antimony pentachloride, zinc chloride and/or zinc chloride dihydrate.

It is also possible, if appropriate, to use a mixture of the abovementioned Lewis acids.

Among the abovementioned Lewis acids, particular preference is given to stannous chloride dihydrate.

The quantitative proportions of constituents (1), (2) and (3) used here are preferably as follows, based on the pure substances: an amount of from 10 to 70% by weight of constituent (1), an amount of from 10 to 60% by weight of constituent (2), and an amount of from 1 to 60% by weight of constituent (3), preference being given to the use of an amount of from 20 to 60% by weight of constituent (1), an amount of from 20 to 55% by weight of constituent (2), and an amount of from 10 to 40% by weight of constituent (3). It is particularly preferable to use an amount of from 30 to 50% by weight of constituent (1), an amount of from 25 to 50% by weight of constituent (2), and an amount of from 15 to 30% by weight of constituent (3). The entirety of all of the constituents (1) to (3) in the mixtures here is always 100%.

As previously stated, for the purposes of the present invention it is preferable that the Lewis acid is a polymer-bound Lewis acid.

A suitable polymer to which the Lewis acid can have been bound is any desired polymeric system.

Examples of polymers used, to which the Lewis acid has been bound, are therefore those selected from the group consisting of acrylate rubber (ACM), ethylene-acrylate rubber (AEM), polyurethane rubber (PUR), butyl rubber (IIR), butadiene rubber (BR), bromobutyl rubber (BIIR), chlorobutyl rubber (CIIR), epichlorohydrin polymer (CO), chlorobutadiene rubber (CR), chlorosulphonated polyethylene polymer (CSM), ethylene oxide-epichlorohydrin rubber (ECO), ethylene-propylene diene rubber (EPDM), ethylene-methyl acrylate copolymer (EMA), perfluoro rubber (FFPM), fluoro rubber (FPM), fluoromethylpolysiloxane (FVMQ), isoprene rubber (IR), acrylonitrile-butadiene rubber (NBR), natural rubber (NR), styrene-butadiene rubber (SBR), chlorinated polyethylene (PE-C) and/or ethylene-vinyl acetate polymer (EVA/EVM) and/or any desired mixtures of these polymers. For the purposes of the present invention, particular preference is given to the use of butyl rubber (IIR).

These polymer-bound Lewis acids are produced via mixing of the polymer with a Lewis acid in familiar mixing apparatuses, e.g. internal mixers, by a process familiar to a person skilled in the art. The mixing temperature is preferably below 100° C.

For the purposes of the present invention it is—as mentioned above—particularly preferable that the Lewis acid is stannous chloride dihydrate. The material used here is in particular butyl-rubber-bound stannous chloride dihydrate.

The present invention also provides butyl-rubber-bound stannous chloride dihydrate. A preferred feature of this is that it takes the form of butyl-bound masterbatch, preferably comprising from 10 to 80% of stannous chloride dihydrate.

The present invention also provides a process for producing a corresponding butyl-rubber-bound stannous chloride dihydrate.

These butyl-rubber-bound stannous chloride dihydrate systems (masterbatch) can be produced via mixing of stannous chloride dihydrate with unsaturated isobutylene-isoprene copolymer, such as Lanxess Butyl 301 from Lanxess. The isobutylene-isoprene copolymer here is charged to an internal mixer and then mixed with the stannous chloride dihydrate. The mixing process here takes place at a temperature of from 40° C. to 90° C. (discharge temperature). Further additives can, if appropriate, be added to the mixing stage, an example being zinc oxide, or silica (carrier).

The present invention also in particular provides the use of butyl-rubber-bound stannous chloride dihydrate used with preference in the form of a masterbatch, as vulcanization accelerator.

All of the compounds (1), (2) and (3) are commercially available products.

By way of example, 3-methylthiazolidine-2-thione (1) is known and can be obtained commercially. 3-Methylthiazolidine-2-thione is marketed, for example, as Rhenocure® CRV and in the form of masterbatch as Rhenogran® MTT-80, from Rhein Chemie Rheinau GmbH.

Tetrabenzylthiuram disulphide is known and can be obtained commercially. Tetrabenzylthiuram disulphide is marketed, for example, in the form of masterbatch as Rhenogran® TBzTD 70, from Rhein Chemie Rheinau GmbH.

There is no particular restriction on the manner of addition of the individual components of this mixture, and the manner of addition can be selected appropriately by the person skilled in the art.

In a first embodiment, each individual constituent of the mixture according to the invention is added in the pure form thereof to the vulcanization elastomers prior to the vulcanization process. The addition here takes place either separately for each substance or in the form of a single blend of pure substances.

In a second embodiment, the individual constituents of the mixture according to the invention can be used in polymer-bound form (masterbatch concentrate). The addition takes place here either in a masterbatch concentrate for each of the substances (1), (2) and (3) separately or in the form of a single masterbatch blend of all of the constituents (1) to (3).

Another possibility is to use individual constituents of the mixture in pure form and other constituents of the mixture in the form of a masterbatch.

For the purposes of the present invention, the addition preferably takes place at least to some extent in the form of a masterbatch, and it is particularly preferable here that the constituent of the Lewis acid according to the invention is used in the form of a masterbatch. The remaining constituents according to the invention—(1) 3-methylthiazolidine-2-thione, (2) thiuram disulphide derivative or thiuram polysulphide derivative and/or mercaptobenzothiazole disulphide—can take the form of powder or granules and can be used in the said form, or else in the form of separate or combined masterbatches, for the purposes of the present invention.

A masterbatch concentrate of (1) generally comprises an amount of from 20 to 95% by weight, in particular from 40 to 90% by weight, preferably from 50 to 85% by weight, particularly preferably from 60 to 80% by weight, in each case based on the total amount of masterbatch, of (1) 3-methylthiazolidine-2-thione.

In another embodiment of the present invention, the mixture according to the invention encompasses (2), i.e. a thiuram disulphide derivative, thiuram polysulphide derivative and/or mercaptobenzothiazole disulphide in the form of masterbatch concentrate. The amount of thiuram disulphide derivative, thiuram polysulphide derivative and/or mercaptobenzothiazole disulphide in the masterbatch is generally from 20 to 95% by weight, in particular from 40 to 90% by weight, preferably from 50 to 85% by weight, particularly preferably from 60 to 80% by weight, based in each case on the total amount of masterbatch.

In another embodiment of the present invention, the mixture according to the invention encompasses the Lewis acid (3) in the form of masterbatch concentrate. The amount of Lewis acid in the masterbatch is generally from 20 to 95% by weight, in particular from 25 to 80% by weight, preferably from 30 to 70% by weight, particularly preferably from 35 to 60% by weight, based in each case on the total amount of masterbatch.

In the event that all of the constituents (1) to (3) are present in the masterbatch, the amounts of (1) to (3) correspond to those of the mixture according to the invention.

In another embodiment of the present invention, the mixture according to the invention also comprises zinc oxide and/or at least one rubber selected from the group consisting of acrylate rubber (ACM), ethylene-acrylate rubber (AEM), polyurethane rubber (PUR), butyl rubber (IIR), butadiene rubber (BR), bromobutyl rubber (BIIR), chlorobutyl rubber (CIIR), epichlorohydrin polymer (CO), chlorobutadiene rubber (CR), chlorosulphonated polyethylene polymer (CSM), ethylene oxide-epichlorohydrin rubber (ECO), ethylene-propylene diene rubber (EPDM), perfluoro rubber (FFPM), fluoro rubber (FPM), fluoromethylpolysiloxane (FVMQ), isoprene rubber (IR), acrylonitrile-butadiene rubber (NBR), natural rubber (NR), styrene-butadiene rubber (SBR), chlorinated polyethylene (PE-C) and/or ethylene-vinyl acetate polymer (EVA/EVM) and/or mixtures thereof.

The mixture according to the invention can moreover encompass antioxidants and antiozonants, and also reinforcing fillers. The reinforcing fillers can, for example, be carbon black and/or silica.

The present invention provides the mixture described in more detail above, where this can—as mentioned above—be used in the form of separate masterbatches or in the form of the pure chemicals.

To produce the mixture according to the invention, the individual constituents of the mixture are mixed with one another by methods familiar to the person skilled in the art. This process is likewise provided by the present invention.

The present invention also provides the use, as vulcanization accelerator, of the mixture described above.

The invention also provides a vulcanizate-production process in which the constituents of the mixture are added individually or together in pure form or in the form of separate masterbatch concentrates or in combinations of pure form and a masterbatch concentrate comprising a plurality of constituents to the rubber to be vulcanized and are then vulcanized.

The vulcanization process takes place by methods familiar to the person skilled in the art, for example during injection moulding in a heated mould.

The addition of the mixture according to the invention can take place by way of the individual constituents or in the form of a mixture of the individual constituents (1) to (3). In the event of separate addition, the method of addition of the individual components here is such as to ensure simultaneous vulcanization-accelerating action of the individual components during the vulcanization process.

The vulcanization-accelerator system according to the invention can be used for any desired types of halogen-containing rubber. Accordingly, the system according to the invention can be used for any desired uncrosslinked, but crosslinkable, polymers having elastomeric properties. In particular, the vulcanization rubber to be used according to the invention can comprise a rubber which has hitherto generally been used for tyres or other rubber applications.

The mixture according to the invention is particularly suitable as vulcanization accelerator for rubbers which are selected from the group consisting of chloroprene rubber (CR), butyl rubber (IIR), bromobutyl rubber (BIIR), chlorobutyl rubber (CIIR), epichlorohydrin polymer (CO), chlorosulphonated polyethylene polymer (CSM), epichlorohydrin rubber (CO), ethylene oxide-epichlorohydrin rubber (ECO), chlorinated polyethylene polymer (CM) and other rubbers or a mixture thereof.

The present invention also provides vulcanizates obtainable by a process according to the invention.

The present invention therefore also provides the use of
(1) 3-methylthiazolidine-2-thione, as a first constituent,
(2) a second constituent, selected from the group of thiuram disulphide derivative, thiuram polysulphide derivative and/or mercaptobenzothiazole disulphide, and
(3) at least one Lewis acid, as third constituent, preferably polymer-bound, as vulcanization accelerator, where the individual abovementioned components are not used in a physical mixture but instead are added individually to the vulcanization rubber. The method of addition of the individual components here is generally such as to ensure simultaneous action of the individual components during the vulcanization process. In particular, the addition of the individual components takes place in immediate succession.

The amounts of the individual constituents used for the vulcanization process are preferably as follows:

The amount used of the first constituent, 3-methylthioazolidine-2-thione, is generally from 0.10 to 10.00 parts by weight, in particular from 0.25 to 5.00 parts by weight, preferably from 0.40 to 3.50 parts by weight, particularly preferably from 0.60 to 2.00 parts by weight, based in each case on 100 parts by weight of the vulcanization polymer.

The amount used of the second constituent, selected from the group consisting of a thiuram disulphide derivative, a thiuram polysulphide derivative and mercaptobenzothiazole disulphide, is generally from 0.10 to 10.00 parts by weight, in particular from 0.25 to 7.50 parts by weight, preferably from 0.50 to 5.00 parts by weight, particularly preferably from 0.70 to 3.00 parts by weight, based in each case on 100 parts by weight of the vulcanization polymer.

The amount used of the third constituent, a Lewis acid, is generally from 0.10 to 10.00 parts by weight, in particular from 0.50 to 8.00 parts by weight, preferably from 0.60 to 6.00 parts by weight, particularly preferably from 0.70 to 4.00 parts by weight, based in each case on 100 parts by weight of the vulcanization polymer.

If the individual constituents are used in the form of a masterbatch, the required amount of masterbatch is determined as a function of the concentration of the individual reactive component in the masterbatch, in such a way as to achieve the amounts stated above of the individual constituents in relation to the vulcanization polymer.

Particular preference is given to a rubber-containing mixture which encompasses, in each based on the rubber,
(1) an amount of from 0.10 to 10.00 parts by weight of the first constituent, 3-methylthiazolidine-2-thione; and
(2) an amount of from 0.10 to 10.00 parts by weight of the second constituent, selected from the group consisting of a thiuram disulphide derivative, a thiuram polysulphide derivative and/or mercaptobenzothiazole disulphide; and
(3) an amount of from 0.10 to 10.00 parts by weight of the third constituent, at least one Lewis acid.

The present invention also provides the rubbers, rubber mixtures or rubber products produced by use of the additive mixture according to the invention. The vulcanizates produced with the vulcanization accelerator according to the invention are suitable by way of example for producing vehicle tyres, gaskets, drive belts of any type, cable sheathing, neoprene suits, spring bellows, dustcaps, and vibromechanical components.

The examples below provide further explanation of the present invention, but have no limiting effect.

EXAMPLES

Vulcanization processes were carried out on Baypren® 110 according to Examples A, B, C and D below.

The method for Example A uses a conventional vulcanization-accelerator system based on ethylenethiourea (Rhenogran® ETU-80) combined with tetramethylthiuram disulphide (Rhenogran® TMTD-70) (comparative example).

The method for Example B (comparative example) uses a vulcanization-accelerator system based on Rhenocure® CRV (3-methylthiazolidine-2-thione), without components (2) and (3).

The method for Example C (comparative example) also uses, in addition to variant B, Rhenogran® TBZTD-70 (tetrabenzylthiuram disulphide), component (2), and finally the method for Example D uses, in addition to variant C, Rhenogran® GE 2012, a butyl-rubber-bound mixture of $SnCl_2$ dihydrate (3) (example according to the invention).

TABLE 1

| Constituent | A Comparison | B Comparison | C Comparison | D according to the invention |
|---|---|---|---|---|
| Baypren ® 110 | 100.0 | 100.0 | 100.0 | 100.0 |
| CB N-550 | 55.0 | 55.0 | 55.0 | 55.0 |
| Rhenofit ® D/A | 4.0 | 4.0 | 4.0 | 4.0 |
| WS zinc oxide | 4.0 | 4.0 | 4.0 | 4.0 |
| Aflux ® 16 | 1.0 | 1.0 | 1.0 | 1.0 |
| Stearic acid | 1.0 | 1.0 | 1.0 | 1.0 |
| Antilux ® 654 | 1.0 | 1.0 | 1.0 | 1.0 |
| 6PPD | 1.0 | 1.0 | 1.0 | 1.0 |
| Rhenofit ® OCD | 2.0 | 2.0 | 2.0 | 2.0 |
| Rhenosin ® W 95 | 5.0 | 5.0 | 5.0 | 5.0 |
| Rhenogran ® ETU-80 (ethylenethiourea, 80% purity) | 1.5 | — | — | — |
| Rhenogran ® TMTD-70 (tetramethylthiuram tetrasulphide, 70% purity) | 1.0 | — | — | — |
| Rhenocure ® CRV (3-methylthiazolidine-2-thione, 100% purity) | — | 1.5 | 1.5 | 1.5 |
| Butyl-rubber-bound $SnCl_2$ dihydrate (40% purity) | — | — | — | 1.5 |
| Rhenogran ® TBzTD-70 (tetrabenzylthiuram disulphide, 70% purity) | — | — | 2.5 | 2.5 |

Baypren ® 110: Polychloroprene rubber (CR), commercially available from Lanxess Deutschland GmbH.
CB N-550: Commercially available N-550 carbon black from Evonik Degussa AG.
Rhenofit ® D/A: Magnesium oxide, commercially available from Rhein Chemie Rheinau GmbH
WS zink oxide: Commercially available "Weßsiegel" zinc oxide from Grillo
Aflux ® 16: Fatty-amide-based processing aid, commercially available from Rhein Chemie Rheinau GmbH
Antilux ® 654: Microcrystalline antiozonant wax, commercially available from Rhein Chemie Rheinau GmbH
6PPD: Paraphenylenediamine-based antioxidant, commercially available from Lanxess Deutschland GmbH as Vulkanox ® 4020
Rhenofit ® OCD: Diphenylamine-based antioxidant, commercially available from Rhein Chemie Rheinau GmbH
Rhenosin ® W 95: Ester plasticizer, commercially available from Rhein Chemie Rheinau GmbH

TABLE 2

| | A | B | C | D |
|---|---|---|---|---|
| Mooney viscosity | | | | |
| ML (1 + 4) @100° C. [MU] | 82 | 88 | 79 | 74 |
| Mooney scorch @ 130° C. | | | | |
| T5 [min] | 6.2 | 7.4 | 14.9 | 8.9 |
| T35 [min] | 9.3 | 18.4 | 21.6 | 12.8 |
| MDR 170° C., 30 min | | | | |
| ML, [dNm] | 2.5 | 2.9 | 2.5 | 2.4 |
| MH, [dNm] | 24.9 | 31.3 | 23.5 | 24.8 |
| t10, [min] | 0.8 | 1.6 | 1.8 | 0.8 |
| t50, [min] | 1.6 | 4.9 | 4.0 | 1.6 |
| t90, [min] | 4.2 | 8.8 | 9.5 | 4.1 |

TABLE 3

| | A | B | C | D |
|---|---|---|---|---|
| Hardness | | | | |
| Hardness [ShA] | 77 | 80 | 74 | 74 |
| Tensile/Elongation | | | | |
| Elongation at break [%] | 245 | 190 | 260 | 260 |
| Tensile strength [MPa] | 21.0 | 20.1 | 20.3 | 20.4 |

FIG. 1 shows the Mooney scorch curve at 130° C. as a function of time (in minutes).

FIG. 2 shows the crosslinking curve at 170° C. as a function of time (in minutes).

Figure 1:
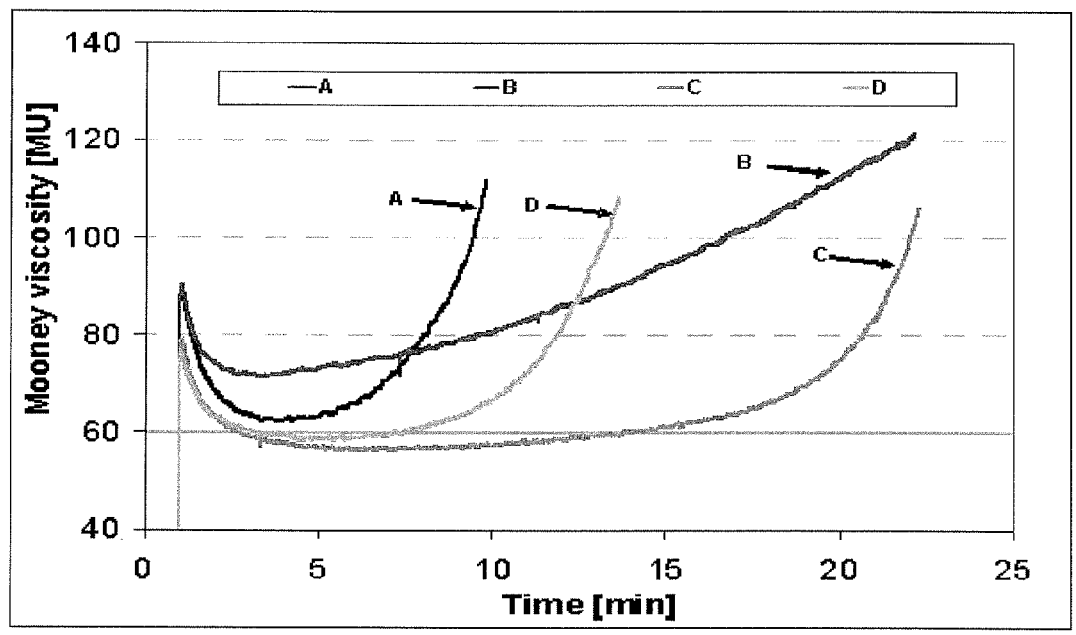
FIGS. 1 and 2 show the individual results graphically.
Figure 2:
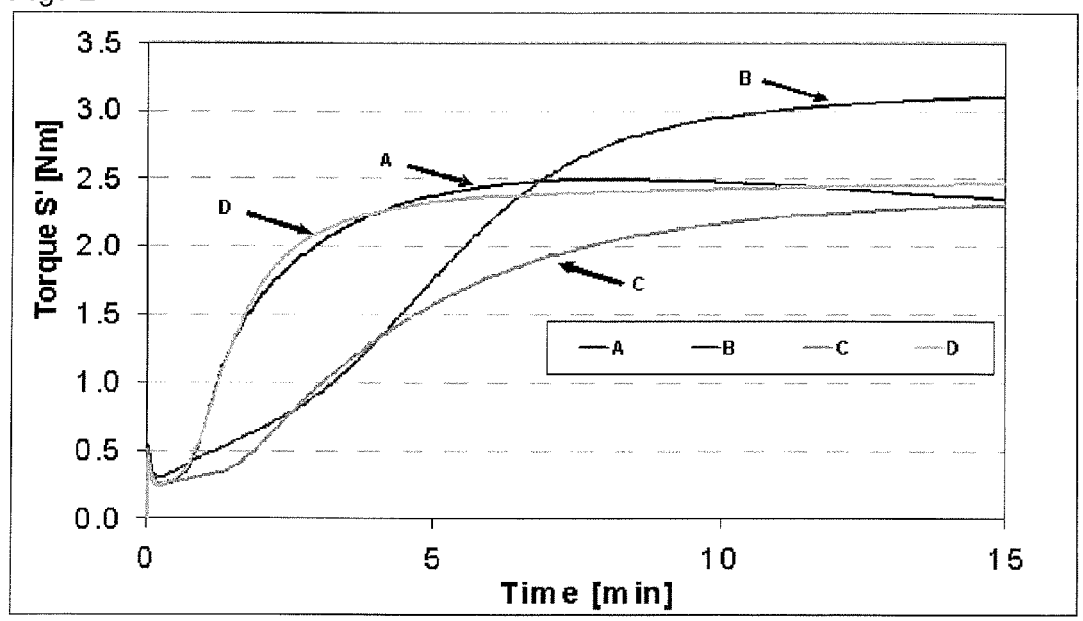

The decisive advantage of the mixture according to the invention is that, as can be seen from the above Tables 2 and 3, the crosslinking rate can be individually adjusted via the appropriate addition of the Lewis acid. Example B exhibits higher viscosity from the beginning, and this is disadvantageous for the processing of the rubber mixture. The crosslinking is moreover markedly slower, inevitably prolonging cycle times in production. Example C exhibits more advantageous behaviour in terms of the viscosity level, but is likewise excessively slow in completing vulcanization. Example D exhibits more advantageous behaviour in the early stages of vulcanization than Example A and therefore provides an adequate level of production process reliability. The time curve for crosslinking at 170° C. for Example D is identical with that for Example A, permitting short cycle time and avoiding prolonged heat-stressing of the material, and also avoiding toxicological side-effects in the production process. The present invention exhibits the most advantageous processing behaviour and crosslinking behaviour and moreover does not generate carcinogenic nitrosamines of any kind, because the TMTD has been replaced by TBzTD. The crosslinking rate of the respective vulcanization system can be matched to the requirements of the process by way of the amount of the Lewis acid added. The pronounced viscosity minimum obtained by using the combination ethylenethiourea and tetramethylthiuram disulphide is also realized here by using the mixture according to the invention.

The system according to the invention is moreover free from substances which are carcinogenic or genotoxic, or which release carcinogenic substances.

What is claimed is:

1. A mixture for accelerating vulcanization of halogen-containing rubbers, the mixture comprising:
   (1) 10-70 wt % 3-methylthiazolidine-2-thione,
   (2) 10-60 wt % tetrabenzylthiuram disulphide, and
   (3) 1-60 wt % at least one Lewis acid selected from the group consisting of stannous chloride, stannous chloride dihydrate, tin dioctanoate, tin oxalate, dibutyltin carboxylate, monobutyltin tris(2-ethylhexanoate), dibutyltin oxide, aluminium(III) chloride, titanium tetrachloride, antimony pentachloride, zinc chloride, and zinc chloride dihydrate,
   wherein the sum of the weight percents of constituents (1), (2) and (3) in the mixture is 100%.

2. The mixture according to claim 1, wherein the at least one Lewis acid is bound on a polymer selected from the group consisting of acrylate rubber (ACM), ethylene-acrylate rubber (AEM), polyurethane rubber (PU), butyl rubber (IIR), butadiene rubber (BR), bromobutyl rubber (BIIR), chlorobutyl rubber (CIIR), epichlorohydrin polymer (CO), chlorobutadiene rubber (CR), chlorosulphonated polyethylene polymer (CSM), ethylene oxide-epichlorohydrin rubber (ECO), ethylene-propylene diene rubber (EPDM), ethylene-methyl acrylate copolymer (EMA), perfluoro rubber (FFPM), fluoro rubber (FPM), fluoromethylpolysiloxane (FVMQ), isoprene rubber (IR), acrylonitrile-butadiene rubber (NBR), natural rubber (NR), styrene-butadiene rubber (SBR), chlorinated polyethylene (PE-C) and/or ethylene-vinyl acetate polymer (EVA/EVM) and/or any desired mixtures of these polymers.

3. The mixture according to claim 1, wherein the at least one Lewis acid is stannous chloride dihydrate.

4. A process for producing the mixture according to claim 1, the process comprising mixing the 3-methylthiazolidine-2-thione, the tetrabenzylthiuram disulphide, and the at least one Lewis acid with one another.

5. A process for producing a rubber vulcanizate, the process comprising: mixing rubber to be vulcanized with the mixture according to claim 1 as a vulcanization accelerator, and vulcanizing the rubber mixture.

6. The process according to claim 5, further comprising using the mixture according to claim 1 as a vulcanization accelerator wherein the rubber is chloroprene rubber (CR), butyl rubber (IIR), bromobutyl rubber (BIIR), chlorobutyl rubber (CIIR), epichlorohydrin polymer (CO), chlorosulphonated polyethylene polymer (CSM), epichlorohydrin rubber (CO), ethylene oxide-epichlorohydrin rubber (ECO), chlorinated polyethylene polymer (CM) and other rubbers or a mixture thereof.

7. The mixture according to claim 2, wherein the at least one Lewis acid is stannous chloride dihydrate.

8. The mixture according to claim 1, wherein the at least one Lewis acid is stannous chloride dihydrate bound to butyl rubber.

9. The mixture according to claim 1, wherein the mixture comprises:
   (1) 30-50 wt % of the 3-methylthiazolidine-2-thione,
   (2) 25-50 wt % of the tetrabenzylthiuram disulphide, and
   (3) 15-30 wt % of the at least one Lewis acid.

10. A mixture for accelerating vulcanization of halogen-containing rubbers, the mixture comprising:
    3-methylthiazolidine-2-thione,
    tetrabenzylthiuram disulphide, and
    stannous chloride dihydrate bound to butyl rubber wherein the sum of the weight percents of constituents of 3-methylthiazolidine-2-thione, tetrabenzylthiuram disulphide, and stannous chloride dihydrate bound to butyl rubber in the mixture is 100.

* * * * *